July 29, 1924.
H. F. PARKER
1,503,374
HEAT TRANSFER SYSTEM FOR AIRCRAFT
Filed April 28, 1922
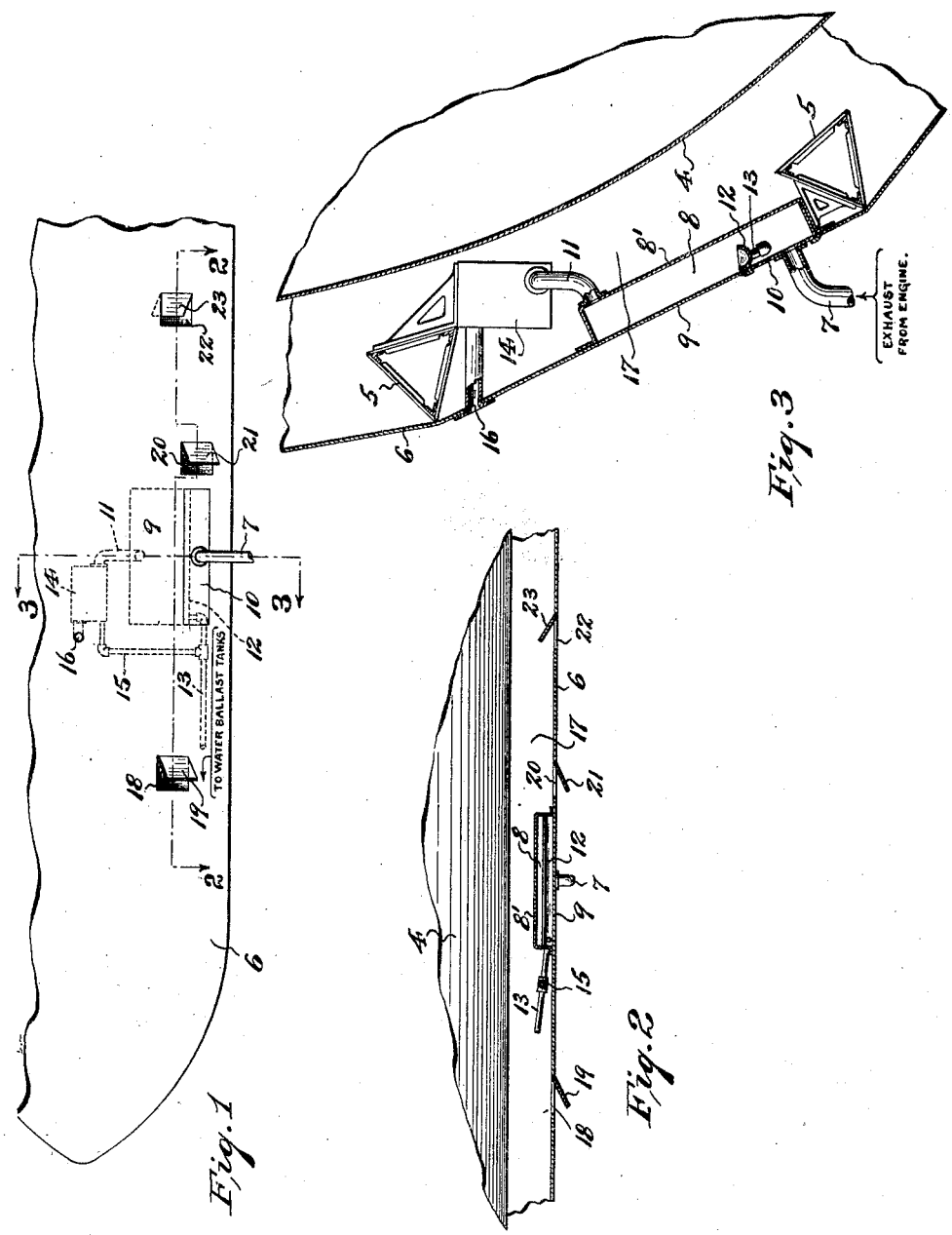
INVENTOR.
Humphrey F. Parker,
BY
Fraentzel and Richards
ATTORNEYS.

Patented July 29, 1924.

1,503,374

UNITED STATES PATENT OFFICE.

HUMPHREY F. PARKER, OF NEW YORK, N. Y.

HEAT-TRANSFER SYSTEM FOR AIRCRAFT.

Application filed April 28, 1922. Serial No. 557,229.

*To all whom it may concern:*

Be it known that I, HUMPHREY F. PARKER, a citizen of New Zealand, residing at New York, in the county of New York and State of New York, have invented certain new and useful Improvements in Heat-Transfer Systems for Aircraft; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to a heat transfer system for aircraft, and has for its object the improvement of processes dependent on the dissipation of the waste heat from the hydrocarbon motors; and particularly to the recovery of water from the exhaust of such motors to replace weight of the fuel burned and thus maintain the total weight of the ship; and in lighter than air craft the utilization of the heat of the motor exhaust for buoyancy control; and for other purposes whereby the transfer of heat is desirable.

The invention seeks mainly to provide a very simple and efficient means and method for recovery of sufficient water from the engine exhaust to compensate for the loss of weight due to the consumption of fuel, the said means being of such novel construction and arrangement as to offer a negligible amount of additional head resistance in flight. Furthermore, the invention provides a construction which additionally permits, by an extremely simple method, the utilization of waste heat to obtain a substantial degree of buoyancy control.

The invention primarily is an improved means of dissipating heat, the improvement lying in the utilization of external surfaces already existing on the aircraft instead of providing additional means located in the air stream, and which are objectionable because of the head resistance thus offered to the flight of the ship. The primary requirement for heat transfer is a surface which separates the hot fluid from the cold fluid, and through which the heat is transferred. The quantity of heat transferred is dependent on the area of the surface and on the velocities of the fluids, in addition to other factors, such as the temperature difference between the hot and the cold fluids and their viscosities and specific heats. Furthermore it is dependent on the friction between the fluids and the surface. Now in all aircraft there are large areas of surface offering frictional resistance to the air through which the craft passes. A particular example of this is the outer envelope of the air ship. In such case there is a surface which is a necessary source of resistance, but is capable of transferring heat; on one side of that surface a cold fluid flows (the air), at high velocity and with considerable skin friction. If now, a hot fluid (e. g. engine exhaust) be caused to flow on the other side of the surface, in contact with the surface, heat will flow from the hot fluid, through the wall, to the cold fluid on the other side of the wall. As it is necessary to conserve the fluids it is desired to cool, the space through which they move must be limited. To effect this a passage is created, one wall of the passageway being the surface exposed to the air stream, and the other wall an idle surface placed inside the structure of the aircraft.

Other objects of this invention, not here more particularly enumerated, will be clearly understood from the following detailed description of the same.

The invention is clearly illustrated in the accompanying drawings, in which:—

Figure 1 is a fragmentary side elevation of an aircraft showing the novel heat transfer means and associated devices connected therewith; Figure 2 is a detail fragmentary horizontal section taken on line 2—2 in said Figure 1; and Figure 3 is a fragmentary transverse section taken on line 3—3 in Figure 1, said view being drawn on an enlarged scale.

Similar characters of reference are employed in all of the hereinabove described views to indicate corresponding parts.

Referring now to the said drawings, the lifting gas supporting the air ship is contained in the gas cell 4; the reference character 5 indicates the longitudinal structural members forming part of a frame of a rigid air-ship; and 6 indicates the outer envelope of the air-ship.

The products of combustion are discharged from an engine or hydrocarbon motor (not shown) through the exhaust pipe 7 into the passageway 8. The outer surface of this passageway is formed in the main by a portion of the outer fabric covering or envelope 6 of the hull of the air-ship, as at 9, but that portion thereof nearest the entrance of the exhaust gases, where the temperature is very high, preferably consists of a metallic plate 10 inserted in the plane of said outer surface of the envelope 6. The extent of the area of the metallic surface or plate 10 depends upon the degree of temperature the fabric 9 may safely withstand, such degree being preferably slightly below the boiling point of water. Consequently it is safe to employ the fabric as a portion of the surface utilized as the outer wall of the passage 8 where such portion of the fabric is reasonably remote from the point of entrance of the hot gas of the exhaust. If desired metallic surface may be used throughout the area employed as the outer wall of the passage 8, the same having greater durability, but the use of fabric for the cooler portions or outlying areas enables a saving in weight to be made. The inner wall 8' of the passage 8 is preferably of sheet metal construction.

The direction of flow of the outer air stream is, of course, horizontally rearwards. The direction of flow of the hot exhaust gases to be cooled is determined by two factors. First, it is desirable when possible to have air and exhaust gases in counter flow, that is, respectively moving in opposite direction, as this arrangement gives the most effective cooling for a given area of surface and velocity of flow. In the later stages of the cooling, however, it is advantageous to cause the hot gases to flow upwards. Water commences to condense from exhaust at about 125° Fahrenheit and the condensation continues until the gases are finally discharged, at about 85° Fahrenheit. In a simple counter-flow system this water will drain off at a temperature below 100° Fahrenheit. By arranging the cooling surface so that the coolest portion is at the top, the water as it condenses, will run down over the hotter surface. It is desirable to drain it off before it reaches a point where it would be turned to steam. A two-fold advantage is then obtained. Firstly, some of the heat that would have to be given up to the air stream is transferred to the water. Thus for a given final exhaust temperature, and hence for a given amount of condensation, slightly less surface is necessary. Secondly, the presence of the water is an aid to the transfer of heat, thus further reducing the amount of surface, necessary to effect a given amount of condensation.

As shown in the drawings the exhaust gases move upward through the space or passage 8, past the metallic cooling surface 10, and the fabric cooling surface 9 to the outlet 11.

The water as it condenses flows down the inner side of the fabric wall 9 until it encounters the catch basin or trough 12, which is preferably connected with the upper margin of the plate 10, to project into the passage 8, said catch basin or trough collecting the water and delivering the same to a pipe 13 which leads to ballast storage tanks (not shown). Before final discharge, the exhaust gases may be passed through a separator 14 to remove particles of water which happen to be carried along in suspension in the gas stream. An apparatus similar to that used in humidifying and dehumidifying in air conditioning work is suitable for this purpose. The water collected by said separator is discharged through a suitable pipe 15 to flow to the ballast tank of the air-craft. After passing through said separator the exhaust gases may be discharged into the atmosphere through an exhaust port 16.

While most of the heat is transferred to the outside air stream by radiation from the surfaces 9 and 10, some of it is given up to the air in the annular space 17 which is disposed between the gas cells 4 and the outer envelope 6. It is in the method of dealing with this portion of the heat that a measure of buoyancy control for the aircraft may be effected.

The hull of the ship is provided with an air intake port 18, provided with a suitable closure means 19, at a point forward of the heat transfer system, through which air may be admitted to the annular space 17, and in addition the hull of the ship is also provided with a second air intake port 20, also provided with suitable closure means 21, located immediately to the rear of said heat transfer system. The hull of the ship is also provided with an air discharge port 22, having suitable controlling means 23, which is located to the rear of the heat transfer system and spaced away from the same and the intake port 20 as may be found expedient.

If it is desired to effect a condition making for a greater lift of the aircraft, the forward air intake port 18 may be closed, stopping the entry of cold air into the annular space 17. The heat given up by the inner wall 8' of the passage 8 is now retained by the air in the annular space 17, expanding such air and rendering it more buoyant. In addition to this the intake port 20 situated immediately to the rear of the heat transfer system may be opened causing the air which has passed by the outer hot surface of the metal plate 10 to be carried into the annular space 17, thus further adding heat to expand the air therein and increase the buoyancy of the craft. This buoyant heated air in turn heats the lifting gas in the containers which is another factor in producing greater lift since the lifting gas expands, while the expansion of the air in the annular space 17 causes the expulsion of some of the cold air formerly there and adds to the increased lifting effect. When the temperature of the gas in the containers or cells 4 and the air in the anular space 17 is lowered the converse effect may be attained. In this case the intake port 18 is open so that the air entering therethrough from the atmosphere sweeps out the warm air in the annular space around the heat transfer system by discharging the same through the discharge port 22, the intake port 20 being under such circumstances closed, all of which tends to reduce the temperature of the air in the annular space 17, consequently also cooling the gas containers or cells 4 and the lifting gas, causing a contraction of the latter. In this manner the lift of the ship may be reduced without valving lifting gas.

So far as the heat transfer means per se is concerned I do not limit the employment of the novel arrangement and construction above described to the purposes of water recovery or buoyancy control above discussed, for I also conceive my invention to broadly include the utilization of an exterior wall surface of an aircraft in combination with a heat transfer means or system, to serve as the main radiating surface of the latter.

I am aware that changes may be made in the arrangements and combinations of the various devices and parts making up the present invention, as well as in the details of the construction of the same, without departing from the scope of my invention as set forth in the foregoing specification, and as defined in the appended claims. Hence, I do not limit my invention to the exact arrangements and combinations of the several devices and parts as described in the said specification, nor do I confine myself to the exact details of the construction of the said parts as illustrated in the accompanying drawings,

I claim:—

1. The combination with an airship provided with an outer envelope and lifting gas containers within and spaced from said outer envelope of heat transfer means comprising an enclosed passage the outer wall of which is aligned in the plane of said outer envelope, an adjustable port forward of said heat transfer means for directing air into the space between said outer envelope and gas containers, and an adjustable port to the rear of said heat transfer means for directing air into said space and from said space to the atmosphere.

2. The combination with a surface of an airship exposed to the air stream, of a heat transfer means comprising a conduit the main heat exchanging wall of which is formed by a portion of said exterior surface, means for delivering engine exhaust gases into said conduit, and means for collecting the water condensed in said conduit.

3. The combination with an airship provided with an outer envelope and internal lifting gas containers separated from said envelope by an annular space, of heat transfer means comprising an enclosed passage the outer wall of which is formed by a portion of said outer envelope, means for delivering engine exhaust gases into said passage, and means for collecting the water condensed in said passage.

4. The combination with an airship provided with an outer envelope and internal lifting gas containers separated from said envelope by an annular space, of heat transfer means comprising an enclosed passage the outer wall of which is formed by a portion of said outer envelope, an intake port provided in said envelope forward of said heat transfer means, means for opening and closing said intake port, a second intake port provided in said envelope immediately in the rear of said heat transfer means, means for opening and closing said second intake port, and an outlet port provided in said envelope.

5. The combination with an airship provided with an outer envelope and internal lifting gas containers separated from said envelope by an annular space, of heat transfer means comprising an enclosed passage the outer wall of which is formed by a portion of said outer envelope, and means provided in said outer envelope adjacent to said heat transfer means for admitting air into said annular space.

6. A method of water recovery for ballasting aircraft consisting in passing engine exhaust gases against the inner surface of an exterior wall of said aircraft the outer surface of said exterior wall being exposed to the air stream, whereby water is condensed from said exhaust gases on said inner surface, and then collecting said condensation for delivery to ballast tanks.

7. A method of recovering water on aircraft consisting in passing engine exhaust gases against the inner surface of a fabric wall, the outer surface of said wall being exposed to the air stream, whereby water is condensed from said exhaust gases.

8. In an air ship, apparatus for recovering water from the exhaust gases from the motors comprising a conduit exposed in part to the air-stream through which said exhaust gases are passed, the exposed portion of said conduit being divided into two zones, the first zone comprising that area of said exposed portion which is subjected to comparatively high temperatures, and the second zone comprising that area which is subjected to a temperature less than the boiling point of water.

9. An apparatus for recovering water from the exhaust gases from airship motors comprising a conduit exposed in part to the air-stream, the exposed portion of said conduit being divided into two zones, the first zone nearest to the entrance of said exhaust gases being of a material adapted to resist high temperatures, and the second zone being adapted to drain the water condensed.

In testimony that I claim the invention set forth above I have hereunto set my hand this 21st day of April, 1922.

HUMPHREY F. PARKER.

Witnesses:
GEORGE D. RICHARDS,
ADOLPH HANSEN.